US009275640B2

(12) United States Patent
Griggs et al.

(10) Patent No.: US 9,275,640 B2
(45) Date of Patent: Mar. 1, 2016

(54) AUGMENTED CHARACTERIZATION FOR SPEECH RECOGNITION

(75) Inventors: Kenneth King Griggs, Roswell, GA (US); Jon A. Arrowood, Smyrna, GA (US)

(73) Assignee: Nexidia Inc., Atlanta, GA (US)

( * ) Notice: Subject to any disclaimer, the term of this patent is extended or adjusted under 35 U.S.C. 154(b) by 597 days.

(21) Appl. No.: 12/624,882

(22) Filed: Nov. 24, 2009

(65) Prior Publication Data
US 2011/0125499 A1    May 26, 2011

(51) Int. Cl.
*G10L 15/183* (2013.01)
*G10L 15/06* (2013.01)
*G10L 15/08* (2006.01)

(52) U.S. Cl.
CPC .............. *G10L 15/183* (2013.01); *G10L 15/063* (2013.01); *G10L 2015/088* (2013.01)

(58) Field of Classification Search
CPC ............ G10L 15/01; G10L 2015/0635; G10L 2015/088; G10L 15/063; G10L 15/083; G10L 15/183
USPC .................. 704/231, 235, 236, 243, 244, 251
See application file for complete search history.

(56) References Cited

U.S. PATENT DOCUMENTS

| | | | | |
|---|---|---|---|---|
| 5,765,132 A * | 6/1998 | Roberts | | 704/254 |
| 5,852,801 A * | 12/1998 | Hon et al. | | 704/244 |
| 6,073,095 A * | 6/2000 | Dharanipragada et al. | ... | 704/242 |
| 6,138,099 A * | 10/2000 | Lewis et al. | | 704/257 |
| 6,192,337 B1 * | 2/2001 | Ittycheriah et al. | | 704/231 |
| 6,208,964 B1 * | 3/2001 | Sabourin | | 704/244 |
| 6,385,579 B1 * | 5/2002 | Padmanabhan et al. | | 704/243 |
| 6,434,521 B1 * | 8/2002 | Barnard | | 704/244 |
| 6,442,518 B1 * | 8/2002 | Van Thong et al. | | 704/235 |
| 6,456,975 B1 * | 9/2002 | Chang | | 704/270.1 |
| 6,505,153 B1 * | 1/2003 | Van Thong et al. | | 704/211 |
| 6,801,893 B1 * | 10/2004 | Backfried et al. | | 704/257 |
| 7,231,351 B1 * | 6/2007 | Griggs | | G10L 15/26 704/243 |
| 7,315,818 B2 * | 1/2008 | Stevens et al. | | 704/235 |
| 7,428,491 B2 * | 9/2008 | Wang et al. | | 704/244 |
| 7,487,086 B2 * | 2/2009 | Griggs | | G10L 15/26 704/235 |
| 7,590,536 B2 * | 9/2009 | Bates et al. | | 704/244 |
| 7,805,299 B2 * | 9/2010 | Coifman | | 704/235 |
| 7,949,524 B2 * | 5/2011 | Saitoh | | G10L 15/22 704/235 |
| 8,015,005 B2 * | 9/2011 | Ma | | G10L 15/26 704/236 |
| 8,140,332 B2 * | 3/2012 | Itoh et al. | | 704/251 |
| 8,271,280 B2 * | 9/2012 | Abe | | 704/243 |
| 8,583,434 B2 * | 11/2013 | Gallino | | 704/251 |
| 2002/0055950 A1 * | 5/2002 | Witteman | ......... | G06F 17/30017 715/203 |
| 2002/0120447 A1 * | 8/2002 | Charlesworth et al. | ....... | 704/254 |
| 2003/0120493 A1 * | 6/2003 | Gupta | | 704/270.1 |
| 2003/0220788 A1 * | 11/2003 | Ky | | G10L 15/26 704/235 |
| 2005/0251384 A1 * | 11/2005 | Yang | | 704/10 |

(Continued)

*Primary Examiner* — Martin Lerner
(74) *Attorney, Agent, or Firm* — Occhiuti & Rohlicek LLP

(57) ABSTRACT

Systems, methods, and apparatus, including computer program products for accepting a predetermined vocabulary-dependent characterization of a set of audio signals, the predetermined characterization including an identification of putative occurrences of each of a plurality of vocabulary items in the set of audio signals, the plurality of vocabulary items included in the vocabulary; accepting a new vocabulary item not included in the vocabulary; accepting putative occurrences of the new vocabulary item in the set of audio signals; and generating, by an analysis engine of a speech processing system, an augmented characterization of the set of audio signals based on the identified putative occurrences of the new vocabulary item.

46 Claims, 4 Drawing Sheets

(56) References Cited

U.S. PATENT DOCUMENTS

| | | | |
|---|---|---|---|
| 2006/0095262 A1* | 5/2006 | Danieli | G10L 15/08 704/251 |
| 2006/0143008 A1* | 6/2006 | Schneider et al. | 704/251 |
| 2007/0019793 A1* | 1/2007 | Cheng | 379/88.01 |
| 2007/0033036 A1* | 2/2007 | Guruparan | 704/251 |
| 2007/0100635 A1* | 5/2007 | Mahajan et al. | 704/276 |
| 2007/0124147 A1* | 5/2007 | Gopinath et al. | 704/257 |
| 2007/0233487 A1* | 10/2007 | Cohen et al. | 704/255 |
| 2007/0244702 A1* | 10/2007 | Kahn et al. | 704/260 |
| 2008/0120636 A1* | 5/2008 | Gahman | 725/28 |
| 2009/0037176 A1* | 2/2009 | Arrowood | 704/253 |
| 2009/0063148 A1* | 3/2009 | Straut | G10L 15/063 704/251 |
| 2009/0083029 A1* | 3/2009 | Doi | G10L 15/26 704/200 |
| 2009/0119101 A1* | 5/2009 | Griggs | G10L 15/26 704/235 |
| 2010/0318359 A1* | 12/2010 | Hamaker et al. | 704/257 |
| 2011/0019805 A1* | 1/2011 | Zoehner | G10L 15/10 379/90.01 |
| 2011/0077936 A1* | 3/2011 | Arumugam et al. | 704/9 |
| 2011/0093270 A1* | 4/2011 | Bhamidipati | G10L 21/00 704/254 |

* cited by examiner

AUGMENTED CHARACTERIZATION FOR SPEECH RECOGNITION

BACKGROUND

Speech processing systems analyze audio streams and can produce outputs such as a transcription or lattice indicating occurrences of phonemes, words, or phrases in the audio stream. Transcriptions are generally linear sequences of units (e.g., words or phonemes). A lattice generally indicates alternative units, each unit spanning an associated interval, allowing alternative transcription hypotheses to be determined from the lattice. Systems often generate multiple transcription hypotheses (e.g., for each word or phrase spoken in the audio stream), usually with some level of confidence attached to each hypothesis.

Speech processing systems generally have a closed set of units, such as a closed word vocabulary or phoneme set. Generally, a speech processing system processes an input and produces a transcript or lattice based on the input in terms of the units in the closed set known to the system. However, in practice, new words, acronyms, names, and other terms are generated in language continuously, and if these terms are not added to the vocabulary of the system, they will not be identified by the speech processing system even if they are spoken in the audio stream. The vocabulary of a speech processing system may also be limited and may not include words specific to a particular field or application (e.g., product names or technical terms). These field-specific words will also not be identified by a speech processing system unless its lexicon is augmented to include such terms. To search for new terms not originally present in the lexicon, the audio stream can be reprocessed by the speech processing system with the new terms added to the vocabulary of the system. As speech processing is a slow and computationally expensive procedure, this process is generally impractical.

SUMMARY

In general, in one aspect, the invention features a computer-implemented method that includes accepting a predetermined vocabulary-dependent characterization of a set of audio signals, the predetermined characterization including an identification of putative occurrences of each of a plurality of vocabulary items in the set of audio signals, the plurality of vocabulary items included in the vocabulary; accepting a new vocabulary item not included in the vocabulary; accepting putative occurrences of the new vocabulary item in the set of audio signals; and generating, by an analysis engine of a speech processing system, an augmented characterization of the set of audio signals based on the identified putative occurrences of the new vocabulary item.

Embodiments of the invention may include one or more of the following features.

The analysis engine may include a wordspotting engine. The method may further include generating, by a user interface engine, a visual representation of the augmented characterization and causing the visual representation to be displayed on a display terminal. The predetermined vocabulary-dependent characterization of the set of audio signals may include quantities representative of confidence scores associated with the putative occurrences of each vocabulary item. The predetermined vocabulary-dependent characterization of the set of audio signals may include a transcript that is generated by a speech recognition engine of the speech processing system. The predetermined vocabulary-dependent characterization of the set of audio signals may include a transcript that is manually generated by a human transcriptionist.

Accepting the new vocabulary item may include accepting a term that is present in a user-provided text corpus. Accepting the new vocabulary item may include accepting a term that is present in a result set of an automatic discovery action. The automatic discovery action may include a web crawler action. The automatic discovery action may include a speech recognition action that is performed on a subset of the set of audio signals or a disjoint set of the set of audio signals using a different vocabulary.

The method may further include identifying putative occurrences of the new vocabulary item. The putative occurrences of the new vocabulary item may be identified by the analysis engine. The putative occurrences of the new vocabulary item may be identified by a human user. Identifying the putative occurrences may include determining quantities representative of confidence scores associated with the putative occurrences of the new vocabulary item. Identifying the putative occurrences may include identifying a duration of each putative occurrence of the new vocabulary item.

Generating the augmented characterization may include comparing the confidence scores associated with the putative occurrences of the new vocabulary item with confidence scores associated with putative occurrences of each vocabulary item in the predetermined characterization. Generating the augmented characterization may includes updating the vocabulary to include the new vocabulary item; and using the updated vocabulary, processing at least a portion of the set of audio signals including the duration of each putative occurrence of the new vocabulary item. Generating the augmented characterization may include inserting the new vocabulary item into the predetermined characterization. Generating the augmented characterization may include deleting a vocabulary item occurring in the predetermined characterization. Generating the augmented characterization may include replacing a vocabulary item occurring in the predetermined characterization with the new vocabulary item. Generating the augmented characterization may include augmenting a word lattice representative of the set of audio signals. Generating the augmented characterization may include updating a transcription of the set of audio signals.

Accepting the new vocabulary item may include accepting the new vocabulary item from a user. The new vocabulary item may be in a language different that that of at least one of the plurality of vocabulary items included in the vocabulary.

The method may further include generating the predetermined vocabulary-dependent characterization of the set of audio signals, where the generating includes aligning, by a transcript alignment engine of the speech processing system, the set of audio signals and a transcript.

The set of audio signals may include one or more of the following: a live audio stream, a legal deposition, a telephone call, and broadcast media. At least a first audio signal of the set of audio signals may be associated with video.

Among other advantages, the methods described herein enable the use of existing fast and efficient searching of an audio stream for occurrences of a new word after the audio stream has already been transcribed using a vocabulary that does not include the new word. New words can be searched for quickly and with relatively little computational investment, enabling efficient retranscription or updated analysis of an audio stream. For instance, an audio file transcribed or otherwise analyzed using a standard dictionary may be re-evaluated to search for occurrences of a proper name, a word or phrase in a foreign language, a word or phrase related to a current event or recently identified technical problem, or the name of a product or promotion.

Other general aspects include other combinations of the aspects and features described above and other aspects and features expressed as methods, apparatus, systems, computer program products, and in other ways.

Other features and advantages of the invention are apparent from the following description and from the claims.

DETAILED DESCRIPTION

Figure 1:
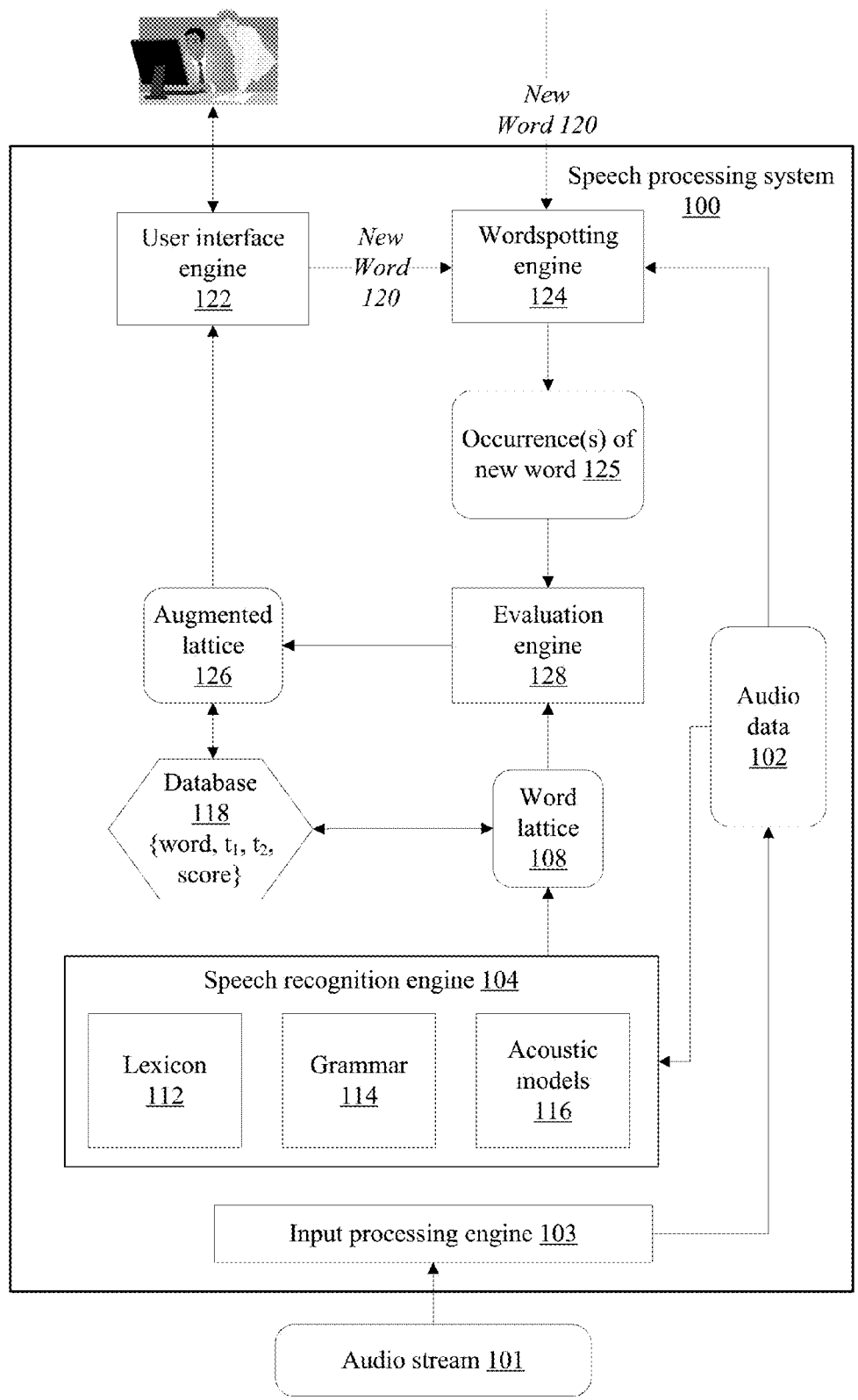
FIG. 1 is a block diagram of a speech processing system.

Referring to FIG. 1, an audio stream 101 is received by a speech processing system 100 and transformed by an input processing engine 103 into audio data 102. Audio stream 101 may be, for instance, an audio recording of a news broadcast, a song, a speech, or a series of telephone conversations to a customer service call center; multimedia documents (e.g., video) that include audio components; or real-time audio, such as a telephone call. The audio data 102 includes acoustically-based data which is derived from the audio stream 101 by sampling its waveform and optionally computing signal processing features or statistically based quantities based on the waveform.

Figure 2:
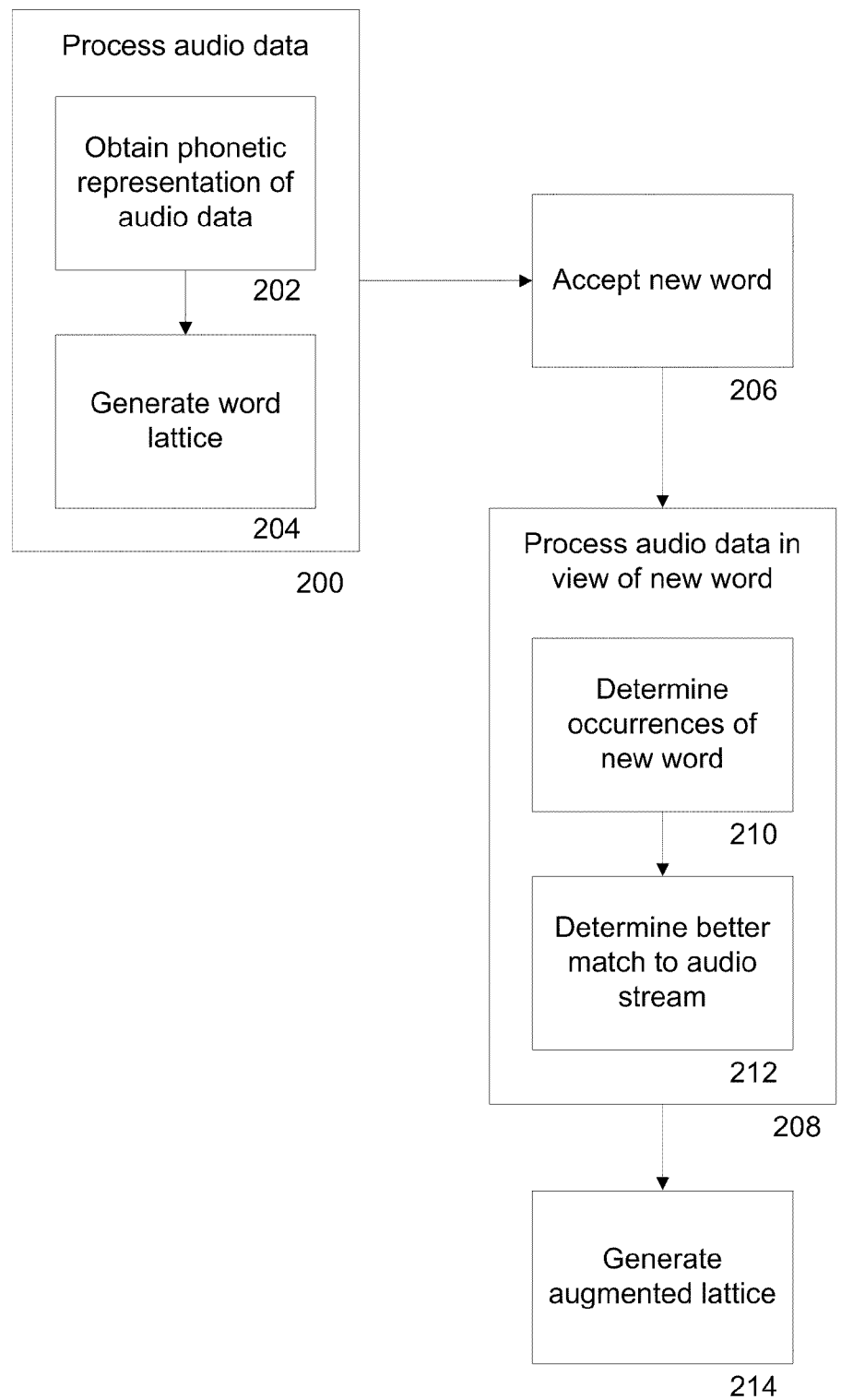
FIG. 2 is a flow chart of speech processing.

Referring to FIGS. 1 and 2, a speech recognition engine 104 processes the audio data 102 using tools such as a lexicon (vocabulary) 112, a grammar 114, and an acoustic model 116 (step 200). Lexicon 112 includes a set of words known to the speech recognition engine 104 at the time of processing the audio stream 101. In some embodiments, lexicon 112 includes specialized terms appropriate for a particular field or application, such as technical terms or names of products and promotions of a company. Grammar 114 includes statistics and/or constraints on word sequences imposed, for instance, by grammatical features (e.g., the part of speech) of the words in lexicon 112. Acoustic model 116 includes statistical models for the acoustic form of the words in lexicon 112, for example based on models of subword units such as phonemes, which are used to define acoustic realizations of the words in the lexicon.

In some embodiments, the processing of the audio data (step 200) produces a word-based lattice. For instance, speech recognition engine 104 first processes audio data 102 according to lexicon 112 to obtain a phonetic representation of the speech represented by the audio data (step 202). In some embodiments, the processed audio data takes the form of a phoneme lattice or a frame synchronous phoneme score file, which provides a searchable phonetic representation of the audio stream. The processed audio data may also include other descriptive information related to the audio stream. For instance, processed audio data corresponding to a log of telephone calls to a call center may contain information such as customer identifiers, customer characteristics (e.g., gender), agent identifiers, call durations, transfer records, date and time of a call, general categorization of calls (e.g., payment vs. technical support), agent notes, and customer-inputted dual-tone multi-frequency (DTMF; i.e., touch-tone) tones. The processed audio data is further processed according to grammar 114 and acoustic model 116 to obtain a transcription or a word lattice 108 (step 204). The following discussion uses the example of a word lattice as the output of speech recognition engine 104; however, the method described below applies to a transcription (e.g., a representation of a linear sequence of words or phonemes) in a similar manner.

Word lattice 108 represents one or more possibilities for words that may occur in audio stream 101 at particular times. Each possible word included in word lattice 108 is associated with a start time $t_1$, an end time $t_2$, and a confidence score representative of the probability that the word is a correct match to the word spoken between time $t_1$ and time $t_2$ in audio stream 101. Word recognition engine 104 may identify multiple possible words for a given time period or for overlapping time periods, each possible word having a different confidence score. A database 118 stores the set of {word, $t_1$, $t_2$, score} for each word included in word lattice 108. In some cases, word lattice 108 does not include the confidence score of each word. In some embodiments, a visual representation of word lattice 108 is output to a user via a user interface engine 122, for example, with time on a first axis and score on a second axis. The word lattice is then used for any of a variety of tasks, such as searching for audio content according to its word content (e.g., searching for particular words, phrases, and their Boolean combinations). When a linear transcript is generated as the output of speech recognition, the transcript may contain only the start times $t_1$ of each word; the end times $t_2$ and scores can be determined after generation of the transcript.

In some examples, a new word not included in lexicon 112 becomes known after a lattice has already been generated. In some embodiments, some time after the audio data 102 have been transcribed or converted into a word lattice by speech recognition engine 104, speech processing system 100 accepts a new word (step 206) input from by a user through user interface engine 122. In other cases, a new word is obtained automatically, such as by an automated web crawler. For instance and without limitation, the new word may be a proper name, a word or phrase in a foreign language, a word or phrase related to a current event or recently identified technical problem, or the name of a product or promotion. In other examples, the pronunciation of a word that is already included in lexicon 112 is changed and the word with the new pronunciation is treated as the new word. For instance, pronunciation may be changed if the pronunciation in the lexicon is flawed or if a speaker in the audio stream has a heavy accent that was recognized only after the initial processing of the audio stream.

A wordspotting engine 124 processes audio data 102 in view of the new word (step 208). In general, a wordspotting engine searches a phonetically-based representation of audio data for phonetically-specified events, such as words or phrases, in the audio. Such a wordspotting engine accepts a search term as input and locates a set of putative instances of the search term in the data, providing a collection of results with a confidence score and a time offset for each result. One implementation of a suitable wordspotting engine is described in U.S. Pat. No. 7,263,484, "Phonetic Searching," issued on Aug. 28, 2007, the contents of which are incorporated herein by reference.

In this case, wordspotting engine 124 searches audio data 102 to determine time intervals for putative occurrences 125 of the new word in audio stream 101 (step 210).

In one embodiment, for each putative occurrence of the new word identified in audio stream 101, wordspotting engine 124 determines whether the original word lattice 108 or the putative occurrence better matches audio stream 101 (step 212), for instance by calculating a score for each putative occurrence of the new word. Wordspotting engine 124 then computes a score for the new word. The score of adjacent words may be affected by the insertion of new word 120. In some cases, the new word replaces a previously existing word (or words) in the word lattice. In other instances, the insertion of the new word causes the deletion of another previously existing word or the insertion of another word in the vicinity of the new word. In some instances, wordspotting engine 124 may not identify any putative occurrences of new word 120 in audio data 102.

Wordspotting engine 124 then compares the score of the new word with the scores of the words contained in the original word lattice 108. If the score of the new word is higher than the score of the words contained in the original word lattice (i.e., the new word is a better match to the audio stream 101 than the existing lattice), an evaluation engine 128 merges the new word arc into the word lattice to generate an augmented lattice 126 (step 214). Each word included in augmented word lattice 126 is identified with a start time $t_1$, an end time $t_2$, and a confidence score representative of the probability that the word is a correct match to the word spoken between time $t_1$ and time $t_2$ in audio stream 101. Often, augmented word lattice 126 includes multiple possible words for any given time period, each possible word having a different confidence score. Database 118 stores the set of {word, $t_1$, $t_2$, score} for each word included in augmented word lattice 126. In the case of a transcription, evaluation engine 128 replaces the appropriate words or phrases in the transcript.

In another embodiment, speech recognition engine 104 performs local audio reprocessing in the vicinity of the putative occurrence of the new word, using an augmented lexicon that includes the new word. Reprocessing the audio data with speech recognition engine 104 allows word-order and grammatical constraints and other language rules to be applied when determining the quality of the match. If speech recognition engine 104 identifies the new word during reprocessing of the audio data 102, evaluation engine 128 merges the new word arc into the original word lattice 108 to generate an augmented word lattice 126.

Once one or more of the putative occurrences of the new word have been evaluated, augmented word lattice 126 or an updated transcript incorporating the new word(s) is outputted to a user via user interface engine 122.

Figure 3A:
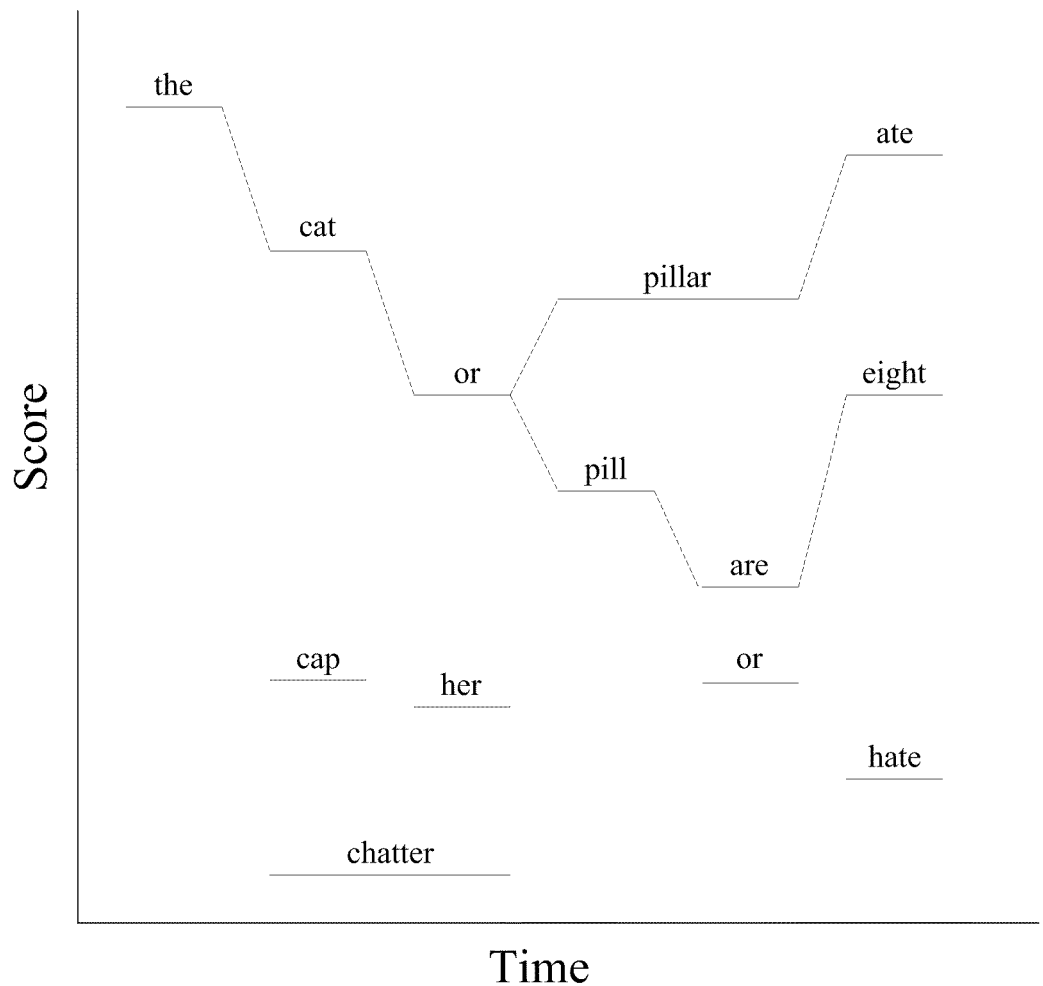
FIGS. 3A and 3B are exemplary word lattices.

As an example, suppose that the phrase "the caterpillar ate" is spoken in an audio recording to be processed by speech processing system 100, but the word "caterpillar" is not included in lexicon 112. When speech recognition engine 104 processes the audio data corresponding to that recording, the phrase "the caterpillar ate" will not be represented in the lattice because speech recognition engine 104 is not aware of the word "caterpillar." Instead, speech recognition engine 104 will process the audio data in view of the vocabulary that is included in lexicon 112, outputting a word lattice as shown in FIG. 3A. In this example, phrases such as "the cat or pillar ate" or "the cat or pill are eight," as shown by the dashed lines connecting identified words in the word lattice, are identified as the most likely possibilities. Other, less likely words are also identified. The start time $t_1$ and end time $t_2$ (reflected on the x-axis) of each of the words in these phrases are determined and each word is assigned a score (reflected on the y-axis) indicating the likelihood of that word accurately reflecting the speech between time $t_1$ and time $t_2$ in the audio recording.

Figure 3B:
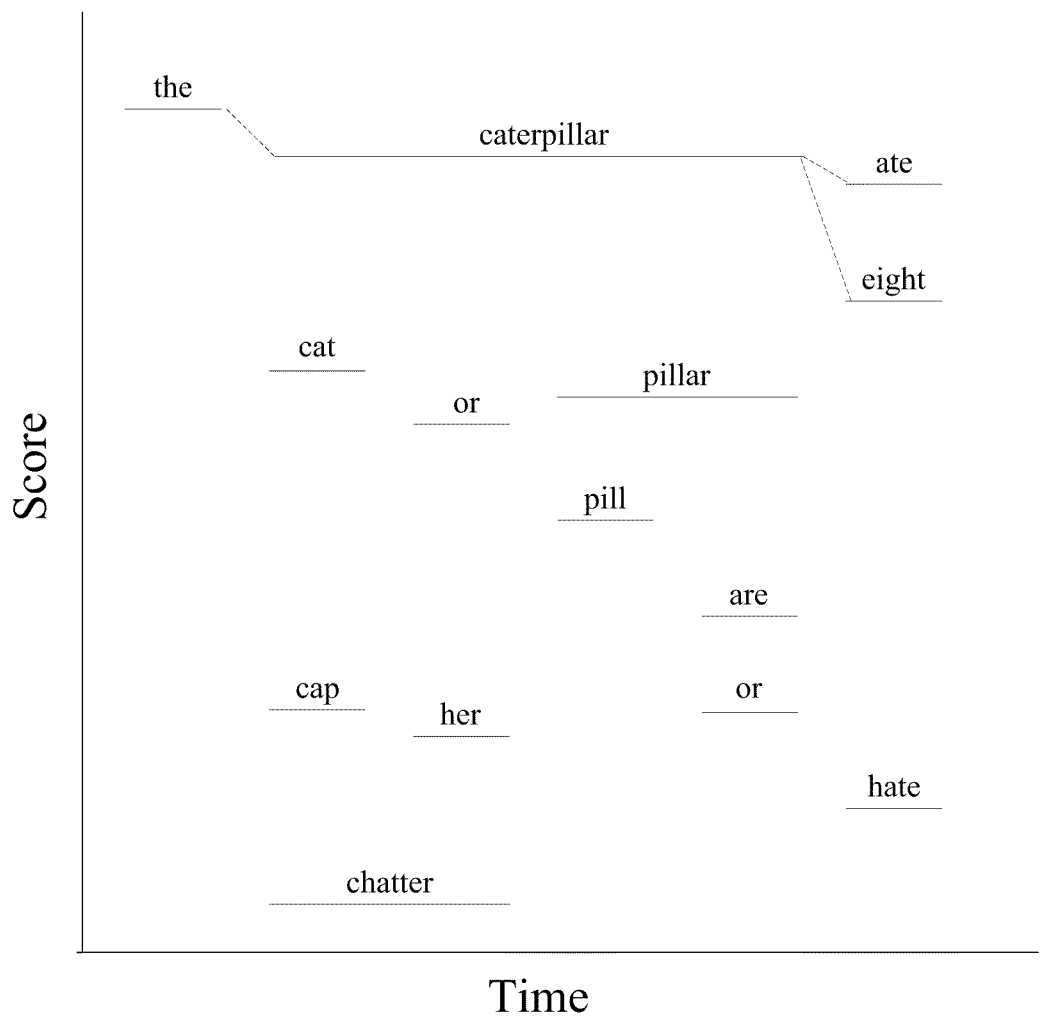

After the audio data are processed by speech recognition engine 104, a user inputs the new word "caterpillar" into the speech processing system 100. For instance, the user may have just become aware of the word "caterpillar" or may have just realized its relevance in a particular application of interest to the user. Wordspotting engine 124 evaluates the audio data 102 to identify putative occurrences of the new word "caterpillar" in audio stream 101. Wordspotting engine 124 then generates an augmented word lattice, shown in FIG. 3B. In the augmented word lattice, the phrase "the caterpillar ate" is identified as the most likely phrase to have been spoken in the audio recording, and the phrase "the caterpillar eight" is identified as a less likely phrase. The phrases previously identified in the original word lattice ("the cat or pillar ate" and "the cat or pill are eight") can still be seen in the augmented word lattice but have significantly lower scores.

In some embodiments, audio stream 101 is initially processed manually by a human transcriptionist to generate a transcript. In these cases, the manually generated transcript is automatically aligned to the audio data 102 and reevaluated as described above to identify putative occurrences of new words that were not known to the person performing the transcription.

In some embodiments, wordspotting engine 124 operates on the entirety of the transcript or word lattice corresponding to audio data 102. In other embodiments, wordspotting engine operates on a part of the transcript or word lattice corresponding to only a portion of audio data 102. Focusing the wordspotting engine on a particular portion of audio data 102 may be useful if, for instance, a user is reasonably certain that the new word occurs during a particular time period.

In the implementation described above, the alteration of the word lattice is performed after speech recognition engine 104 has already completely processed audio data 102. In other embodiments, the alteration of the word lattice by wordspotting engine 124 is performed concurrently with the processing of the audio data by speech recognition engine 104. For instance, during the processing of a continuous audio stream by speech recognition engine 104, the wordspotting engine 124 simultaneously augments an already-generated portion of the word lattice.

In the implementation described above, speech recognition engine 104 and wordspotting engine 124 are distinct entities within speech processing system 100. In other implementations, the speech recognition and wordspotting functions are both performed by a single engine.

Speech processing system 100 may be implemented in software, in firmware, in digital electronic circuitry, in computer hardware, or in combinations thereof. The system may include a computer program product tangibly embodied in a machine-readable storage device for execution by a programmable processor. Method steps are performed by a programmable processor executing a program of instructions to perform functions by operating on input data and generating output. The system may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language; in any case, the language can be a compiled or interpreted language. Suitable processors include, by way of example, both general and special purpose microprocessors.

Generally, a processor receives instructions and data from a read-only memory and/or a random access memory. Generally, a computer includes one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, for instance, semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
   accepting an original data representation of a time ordered collection of items from a first vocabulary, the original representation having been obtained by a first processing of an audio signal using the first vocabulary and comprising an identification of occurrences of vocabulary items of a first vocabulary in time intervals of the audio signal;
   accepting a new vocabulary item not included in the original data representation obtained by the first processing of the audio signal using the first vocabulary;
   causing an automatic speech processor to automatically identify, in the audio signal, a plurality of occurrences of the accepted new vocabulary item, including using the automatic speech processor to perform a second processing including identification of the plurality of occurrences in the time intervals of the audio signal in which the vocabulary items of the first vocabulary were identified in the original data representation by the first processing; and
   processing the original data representation of the time ordered collection of items from the first vocabulary using the identified plurality of occurrences of the new vocabulary item to form an augmented data representation of the time ordered collection of items.

2. The method of claim 1, wherein the automatic speech processor comprises a wordspotting engine.

3. The method of claim 1, further comprising generating, by a user interface engine, a visual representation of the augmented data representation and causing the visual representation to be displayed on a display terminal.

4. The method of claim 1, wherein the original data representation includes quantities representative of confidence scores associated with the preliminary occurrences of each vocabulary item.

5. The method of claim 4 wherein the original data representation includes start times and end times associated with the preliminary occurrences of each vocabulary item.

6. The method of claim 5 wherein at least some time intervals of the audio signal are associated with a plurality of preliminary occurrences in the original data representation.

7. The method of claim 5 wherein each time interval of the audio signal is associated with a single preliminary occurrence in the original data representation.

8. The method of claim 1, wherein the original data representation is generated by a speech recognition engine.

9. The method of claim 1, wherein the original data representation is manually generated by a human transcriptionist.

10. The method of claim 1, wherein accepting the new vocabulary item includes accepting a term that is present in a user-provided text corpus.

11. The method of claim 1, wherein accepting the new vocabulary item includes accepting a term that is present in a result set of an automatic discovery action.

12. The method of claim 11, wherein the automatic discovery action comprises a web crawler action.

13. The method of claim 11, wherein the automatic discovery action comprises a speech recognition action that is performed on a subset of the set of audio signals or a disjoint set of the set of audio signals using a different vocabulary.

14. The method of claim 1, further comprising identifying preliminary occurrences of the new vocabulary item.

15. The method of claim 14, wherein the preliminary occurrences of the new vocabulary item are identified by the automatic speech processor.

16. The method of claim 14, wherein identifying the preliminary occurrences includes determining quantities representative of confidence scores associated with the preliminary occurrences of the new vocabulary item.

17. The method of claim 16, wherein generating the augmented data representation includes comparing the confidence scores associated with the preliminary occurrences of the new vocabulary item with confidence scores associated with preliminary occurrences of each vocabulary item in the original data representation.

18. The method of claim 14, wherein identifying the preliminary occurrences includes identifying a duration of each preliminary occurrence of the new vocabulary item.

19. The method of claim 1, wherein automatically identifying occurrences of the new vocabulary item includes:
   updating the vocabulary to include the new vocabulary item; and
   using the updated vocabulary, processing at least a portion of the audio signal including the duration of each preliminary occurrence of the new vocabulary item.

20. The method of claim 1, wherein forming the augmented data representation includes inserting the new vocabulary item into the original data representation.

21. The method of claim 20 wherein forming the augmented data representation includes re-processing a portion of the audio signal in a first time interval surrounding a time interval associated with the inserted new vocabulary item to determine confidence scores for preliminary occurrences of words in the first time interval.

22. The method of claim 21 wherein the reprocessing is based on one or more of word order, grammatical constraints, and language rules.

23. The method of claim 1, wherein forming the augmented data representation includes deleting a vocabulary item occurring in the original data representation.

24. The method of claim 1, wherein forming the augmented data representation includes replacing a vocabulary item occurring in the original data representation with the new vocabulary item.

25. The method of claim 1, wherein forming the augmented data representation includes augmenting the word lattice representative of the audio signal.

26. The method of claim 1, wherein forming the augmented data representation includes updating the transcript.

27. The method of claim 1, wherein accepting the new vocabulary item includes accepting the new vocabulary item from a user.

28. The method of claim 1, wherein the new vocabulary item is in a language different than that of at least one of the plurality of vocabulary items included in the first vocabulary.

29. The method of claim 1, further comprising:
   generating the original data representation, wherein the generating includes aligning, by a transcript alignment engine of the automatic speech processor, the audio signal and a transcript.

30. The method of claim 1, wherein the audio signal comprise one or more of the following: a live audio stream, a legal deposition, a telephone call, and broadcast media.

31. The method of claim 30, wherein the audio signal is associated with video.

32. The method of claim 1 wherein each of the automatically identified occurrences of the new vocabulary item is potentially incorrect.

33. The method of claim 1 wherein accepting the new vocabulary item comprises accepting a single item from a user.

34. The method of claim 1 wherein the original data representation includes a lexical transcript.

35. The method of claim 1 wherein the original data representation includes a lattice.

36. The method of claim 35 wherein the lattice includes a phoneme lattice.

37. The method of claim 35 wherein the lattice includes a word lattice.

38. A non-transitory computer-readable medium storing instructions for causing a processor of a speech processing system to:
   accept an original data representation of a time ordered collection of items from a first vocabulary, the original representation having been obtained by a first processing of an audio signal using the first vocabulary and comprising identification of occurrences of vocabulary items of a first vocabulary in time intervals of the audio signal in the form of a lattice or a transcript;
   accept a new vocabulary item not included in the original data representation obtained by the first processing of the audio signal using the first vocabulary;
   automatically identify, in the audio signal, a plurality of putative occurrences of the accepted new vocabulary item, including using the automatic speech processor to perform a second processing including identification of the plurality of putative occurrences in the time intervals of the audio signal in which the vocabulary items of the first vocabulary were identified in the original data representation by the first processing; and
   automatically process the original data representation of the time ordered collection of items from the first vocabulary and the identified plurality of putative occurrences of the new vocabulary item to form an augmented data representation of the time ordered collection of items.

39. The method of claim 38, wherein the original data representation includes quantities representative of confidence scores associated with the preliminary occurrences of each vocabulary item.

40. The method of claim 39 wherein the original data representation includes start times and end times associated with the preliminary occurrences of each vocabulary item.

41. The method of claim 40 wherein at least some time intervals of the audio signal are associated with a plurality of preliminary occurrences in the original data representation.

42. The method of claim 40 wherein each time interval of the audio signal is associated with a single preliminary occurrence in the original data representation.

43. The method of claim 38, wherein forming the augmented data representation includes inserting the new vocabulary item into the original data representation.

44. The method of claim 43 wherein forming the augmented data representation includes re-processing a portion of the audio signal in a first time interval surrounding a time interval associated with the inserted new vocabulary item to determine confidence scores for preliminary occurrences of words in the first time interval.

45. The method of claim 44 wherein the reprocessing is based on one or more of word order, grammatical constraints, and language rules.

46. A speech recognition system comprising:
   an input for receiving an original data representation of a time ordered collection of items from a first vocabulary, the original representation having been obtained by a first processing, by a speech recognition engine, of an audio signal using the first vocabulary and comprising an identification of occurrences of vocabulary items of a first vocabulary in time intervals of the audio signal;
   an input for accepting a new vocabulary item not included in the original data representation obtained by the first processing of the audio signal using the first vocabulary;
   wherein the automatic speech processor is configured to automatically identify, in the audio signal, a plurality of occurrences of the accepted new vocabulary item, including performing a second processing including identification of the plurality of occurrences in the time intervals of the audio signal in which the vocabulary items of the first vocabulary were identified in the original data representation by the first processing; and
   an evaluation engine for processing the original data representation of the time ordered collection of items from the first vocabulary using the identified plurality of occurrences of the new vocabulary item to form an augmented data representation of the time ordered collection of items.

* * * * *